3,202,630
BIS(DIALKYLAMINO)DIPHENYLAMINES AS ANTIOZONANTS FOR RUBBER
Frank A. V. Sullivan, Westfield, N.J., assignor to American Cyanamid Company, New York, N.Y., a corporation of Maine
No Drawing. Filed Dec. 8, 1959, Ser. No. 858,021
4 Claims. (Cl. 260—45.9)

This invention relates to the preservation of rubber and more particularly is concerned with an improved method of inhibiting the deterioration of vulcanized rubber by the action of atmospheric ozone by a new class of bis(dialkylamino)diphenylamines as antiozonants.

It has long been known that atmospheric oxygen causes deterioration of vulcanized rubber. In order to inhibit such deterioration, it is conventional practice to incorporate into rubber stock prior to vulcanization any of various chemical compounds which have been found to have antioxidant properties. It also has been recognized that atmospheric ozone is an important factor in the deterioration of vulcanized rubber, particularly when the rubber is under stress. In contrast to oxygen, however, which attacks rubber throughout, ozone attacks rubber only at its surface. Because of this, it has been proposed to protect against ozone by incorporating certain waxes during compounding which will migrate to the surface and provide an ozone protective film, or to coat vulcanized products with an ozone protective material. Such protective films and coatings, however, are useful only so long as they remain unbroken. Once broken, which readily occurs with products under stress, ozone is again free to attack.

An obviously desirable way to provide ozone resistance to rubber is to incorporate in the rubber during compounding a material which is capable of inhibiting the action of ozone. This would be a rather simple solution if the various available excellent rubber antioxidants also had the property of protecting against ozone deterioration since it would involve merely the use of a known antioxidant. But as oxygen and ozone each have a different effect on rubber, so must these effects be protected against differently. It is a well-known fact that, in general, conventional rubber antioxidants offer little if any protection against atmospheric ozone. In fact, there are some well-known antioxidants which actually promote the attack of ozone on rubber. Accordingly, there has been a continuing demand for materials which are specifically capable of inhibiting ozone deterioration when incorporated in rubber.

A material to be useful as an antiozonant must possess certain characteristics. Obviously, it must be capable of suppressing the deteriorating action of ozone. Preferably, it should be capable of providing this protection to both natural as well as synthetic rubber products. Additionally, it should be non-toxic under conventional rubber processing conditions and especially it should not produce a sensitization or irritation of the skin. It must be of sufficiently low vapor pressure to remain in the rubber during processing. Its solubility in the rubber must be such as to provide a continual migration to the surface where ozone attacks. Finally, it should be available in sufficient quantity and at a reasonable cost.

In accordance with the present invention it has been discovered that certain bis(dialkylamino)diphenylamines are excellent antiozonants for rubber and inhibit the deleterious effect of atmospheric ozone on rubber to a considerable degree.

The new antiozonants of this invention are bis(dialkylamino)diphenylamines which may be represented by the following general formula:

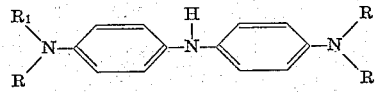

wherein each R is the same alkyl of one to four carbon atoms and $R_1$ is either an additional R or hydroxyethyl.

The new antiozonants of this invention may be prepared by reacting a suitable N,N-dialkyl-p-phenylenediamine with an appropriate N,N-dialkylaniline in the presence of a suitable oxidizing agent such as hydrogen peroxide, chromic acid, ceric sulphate, benzoyl peroxide, di-tert-butyl peroxide, etc. at a temperature of from about 0° C. to about 50° C. Suitable N,N-dialkyl-p-phenylenediamines which may be employed are N,N-dimethyl-p-phenylenediamine, N,N-diethyl-p-phenylenediamine, N-ethyl-N-2-hydroxyethyl-p-phenylenediamine, N-methyl-N-ethyl-p-phenylenediamine, N,N-di-n-propyl-p-phenylenediamine, N,N-diisopropyl-p-phenylenediamine, N,N-di-n-butyl-p-phenylenediamine, etc. Suitable N,N-dialkylanilines which may be employed are N,N-dimethylaniline, N,N-diethylaniline, N-ethyl-N-2-hydroxyethylaniline, N-methyl-N-ethylaniline, N,N-di-n-propylaniline, N,N-diisopropylaniline, N,N-di-n-butylaniline, etc.

The antiozonants of this invention may be employed in various ways. The most preferred way is to add the antiozonant during compounding. Alternatively, but not as practical and, accordingly, not as desirable, is to dip, paint or spray vulcanized rubber with a solution of the antiozonant in a suitable solvent. The amount of antiozonant employed may vary from about one to five parts per 100 parts of rubber. Usually the amount will be about 2 to 3 parts per 100 parts of rubber. In the case of synthetic rubbers, the amount employed may be slightly less or more than that employed in natural rubber depending upon the particular synthetic rubber.

Since antiozonants are generally inadequate as antioxidants, it is the practice in the rubber trade to employ an antioxidant in conjunction with an antiozonant. The antiozonants of this invention do not differ from other known antiozonants in this respect and are preferably employed in conjunction with an antioxidant. The antioxidant employed, of course, may be widely varied and does not form a part of this invention. Any of the well-known conventional antioxidants may be employed to protect the rubber against oxidation. The antioxidant is employed in an amount falling within the same overall range described above with respect to the antiozonant. Generally, however, the amount of antioxidant will be somewhat less than the amount of antiozonant employed.

In addition to natural rubber, the treatment of synthetic rubber is also contemplated by the present invention. The latter include, for example, synthetic rubber-like polymers of butadiene-1,3 and copolymers of butadiene-1,3 with other polymerizable compounds. Examples of synthetic rubber-like polymers of butadiene-1,3 or substituted butadiene-1,3 are polymerized butadiene-1,3, methyl-2-butadiene-1,3 (isoprene), chloro-2-butadiene-1,3 (chloroprene), piperylene and 2,3-dimethylbutadiene-1,3. Illustrative copolymers include notably those of butadiene-1,3 with polymerizable compounds which contain an olefinic (—CH=CH—) group wherein at least one of the disconnected valences is attached to a group which substantially increases the electrical dissymmetry or polar character of the molecule. Examples of such compounds are aryl olefins, such as styrene and vinyl naphthalene;

the alpha methylene carboxylic acids, and their esters, nitriles, and amides, such as acrylic acid, methyl acrylate, methyl methacrylate, acrylonitrile, methacrylonitrile, methacrylamide, isobutylene, methyl vinyl ether, methyl vinyl ketone, and vinylidene chloride. The better-known, commercially-developed synthetic rubbers of the above types are polymerized chloro-2-butadiene-1,3; copolymers of butadiene-1,3 and styrene, and copolymers of butadiene-1,3 and acrylonitrile. The term "rubber" as used herein, is intended to include both natural and artificial rubbers.

The invention will be described in greater detail in conjunction with the following specific examples in which the parts are by weight unless otherwise specified.

EXAMPLE 1

*4,4'-bis(dimethylamino)diphenylamine*

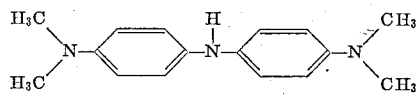

A solution of 20 parts of sodium dichromate dihydrate in a mixture of 6 parts of glacial acetic acid and 200 parts of water was added during about 2 hours to a solution of 17.25 parts of N,N-dimethyl-p-phenylenediamine hydrochloride and 12.1 parts of N,N-dimethylaniline in a mixture of 20 parts of 37.5% hydrochloric acid and 450 parts of water while stirring at a temperature of 2–4° C. The resulting dark green solution was stirred for 3 hours at room temperature, and then at 45° C. a solution of 13.6 parts of zinc chloride in 20 parts of water was added with stirring. After cooling to 12° C., the copper-colored crystalline precipitate was filtered off and dried at 50–60° C. About 34 parts of crystalline material was thus obtained.

A solution of 20 parts of the above precipitate in 50 parts of water was added slowly over about 30 minutes to a solution of 20 parts of sodium hydrosulfite in 500 parts of water containing 10 parts of sodium hydroxide and 13.5 parts of ammonia. After stirring for 30 minutes at room temperature, the light gray precipitate was filtered off, washed on the filter with water and dried in vacuo over calcium chloride. The crude product amounted to 11 parts melting at 104–109° C. Purification by crystallizing from n-hexane gave almost colorless crystals melting at 114–116° C.

EXAMPLE 2

*4,4'-bis(dimethylamino)diphenylamine*

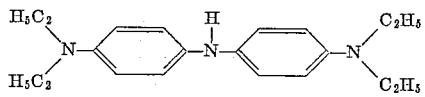

A solution of 20 parts of sodium dichromate in 200 parts of water was added slowly at about 9–10° C. with stirring to a solution of 16.4 parts of N,N-diethyl-p-phenylenediamine and 14.9 parts of N,N-diethylaniline in a mixture of 400 parts of water, 23.8 parts of 37.5% hydrochloric acid and 6 parts of glacial acetic acid. After stirring the dark green solution for 1 hour, a solution of 13.6 parts of zinc chloride in 20 parts of water was added. This was followed by the gradual addition of 54 parts of 17% hydrochloric acid and a solution of 13.6 parts of zinc chloride. The small, green, needle-like crystals were filtered off and dried at 55° C. This zinc chloride double salt amounted to about 34 parts.

To a solution of 24 parts of sodium hydrosulfite in 500 parts of water containing 10 parts of sodium hydroxide and 13.5 parts of ammonia there was added during about 45 minutes 24 parts of the above zinc chloride double salt at room temperature. The resulting crude product was filtered off, washed with water and dried. It amounted to 14 parts, which after crystallization from n-hexane, melted at 52–53° C.

In a similar manner 22 parts of N,N-di-n-butyl-p-phenylenediamine were reacted with 20.5 parts of N,N-di-n-butylaniline to give 4,4'-bis(dibutylamino)-diphenylamine.

EXAMPLE 3

*4-diethylamino-4'-dimethylaminodiphenylamine*

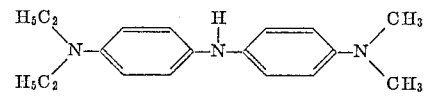

A solution of 17.25 parts of N,N-dimethyl-p-phenylenediamine hydrochloride and 14.9 parts of N,N-diethylaniline in 400 parts of water and 23.6 parts of 37% hydrochloric acid was cooled to 12° C., and a solution of 20 parts of potassium dichromate in 250 parts of water plus 6 parts of glacial acetic acid was slowly added. The resulting dark green solution was stirred at 12° to 15° for 30 minutes, and then a solution of 68 parts of zinc chloride in 80 parts of water was added. When 98 parts of 5.7% aqueous solution of ammonia had been added, the precipitate was separated by filtration and dried.

A solution of 31.8 parts of the above precipitate in 450 parts of water was added slowly at 25° C. to a solution of 10 parts of sodium hydroxide and 25 parts of sodium hydrosulfite in a mixture of 440 parts of water and 90 parts of 28.7% aqua ammonia. After 1.5 hours of stirring, the resulting precipitate was separated by filtration, washed with water and dried in vacuo over calcium chloride. After crystallization from n-hexane, the product melted at 69–70° C.

EXAMPLE 4

*4-diethylamino-4'-(N-ethyl-N-beta-hydroxyethylamino)-diphenylamine*

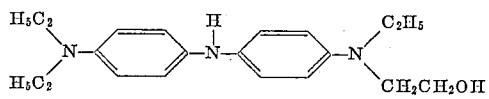

A solution of 20 parts of potassium dichromate in 200 parts of water was added slowly at about 13° C. or below to a solution of 16.4 parts of N,N-diethyl-p-phenylenediamine and 16.5 parts of N-ethyl-N-beta-hydroxyethylaniline in 400 parts of water plus 23.6 parts of 37% hydrochloric acid and 6 parts of glacial acetic acid. To the resulting solution there was added a solution of 54.4 parts of zinc chloride in 200 parts of water. A green crystalline precipitate was filtered off and dried. The zinc salt amounted to 51 parts.

A solution of 25 parts of the above zinc salt in 250 parts of water was added slowly to a solution of 10 parts of sodium hydroxide and 24 parts of sodium hydrosulfite in 440 parts of water plus 45 parts of 28.7% aqua ammonia. The resulting precipitate was filtered off and washed with water. After drying and crystallizing from a mixture of benzene and n-hexane, the product melted at 75–77° C.

EXAMPLE 5

*Butadiene-styrene (SBR) co-polymer base compound*

| | Parts |
|---|---|
| Philiprene 1600 [1] | 150 |
| Circosol 2–XH (mineral oil) | 6 |
| Zinc oxide | 5 |
| Stearic acid | 1.5 |
| Sulfur | 2 |
| N-oxydiethylene-benzothiazole-2-sulfenamide | 1 |
| Antiozonant | 3 |

[1] Philiprene 1600=100 parts cold SBR (styrene-butadiene rubber manufactured with 1.25% antioxidant therein), 50 parts HAF black (furnace black).

Compositions based on the above formula were prepared and cured for 50 minutes at 144.5° C. These were then tested by exposure to ozone in the dynamic ozone exposure test by exposing the samples of rubber to 25 parts of ozone in 100,000,000 parts of air at 38° C. The samples were flexed from 10–30% elongation at 6 cycles per minutes and were examined at 100% elongation. The results are shown in the following tables:

TABLE 1

|  | No antiozonant | 4,4'-bis(dimethyl-amino)diphenylamine |
|---|---|---|
| Dynamic ozone exposure test—visual rating: |  |  |
| After 1 hour | Very slight cracking on both edges. | No apparent cracking. |
| After 3 hours | Cracks on both edges. | Do. |
| After 6 hours | Deeper cracks on both edges and pitted surface. | Do. |
| After 24 hours | Deep cracks on edges and surface. | Very slight cracking on one edge. |
| After 27 hours | Very deep cracks on edges. | Small cracks on both edges. |
| Unaged tensile data: |  |  |
| Modulus at 200% | 650 | 900. |
| Modulus at 300% | 1,375 | 1,800. |
| Tensile strength | 2,950 | 2,975. |
| Elongation, percent | 550 | 490. |

TABLE 2

|  | No antiozonant | 4,4'-bis(dimethyl-amino)diphenylamine |
|---|---|---|
| Dynamic ozone exposure test—visual rating: |  |  |
| After 1 hour | Very small cracks on both edges. | No apparent cracking. |
| After 3 hours | More and deeper cracks on both edges. | Do. |
| After 6 hours | Larger and deeper cracks on edges. | Do. |
| After 24 hours | Deep cracks on edges and surface. | Cracking on both edges. |
| Unaged tensile data: |  |  |
| Modulus at 200% | 825 | 750. |
| Modulus at 300% | 1,625 | 1,475. |
| Tensile strength | 3,075 | 2,975. |
| Elongation, percent | 540 | 580. |

EXAMPLE 6

*Natural rubber base compound*

| Smoked sheets | 100 |
|---|---|
| Whiting | 70 |
| Clay | 9 |
| Semi-reinforcing furnace black | 8 |
| Easy processing channel black | 2 |
| Circo Lite (mineral oil) | 3 |
| Zinc oxide | 5 |
| Phenyl-β-naphthylamine | 0.75 |
| Sulfur | 2.25 |
| Benzothiazole disulfide | 0.5 |
| Di-o-tolylguanidine | 0.3 |
| Antiozonant | 3.0 |

Compositions based on the above formula were prepared and vulcanized by curing for 25 minutes at 141° C. The results are shown in the following table:

TABLE 3

|  | No antiozonant | 4,4'-bis(dimethyl-amino)diphenylamine |
|---|---|---|
| Dynamic ozone exposure test—visual rating: |  |  |
| After 1 hour | Cracking on both edges. | No apparent cracking. |
| After 3 hours | More and deeper cracking on both edges. | Do. |
| After 6 hours | Cracking on edges and surface. | Small cracks on both edges. |
| After 24 hours | Deep cracking on edges and surface. | Do. |
| Unaged tensile data: |  |  |
| Modulus at 200% | 300 | 275. |
| Modulus at 300% | 500 | 450. |
| Tensile strength | 2,450 | 2,300. |
| Elongation, percent | 6,640 | 640. |

I claim:

1. Vulcanized rubber having incorporated therein from about one to about five parts per 100 parts of rubber of an antiozonant consisting of a compound of the formula:

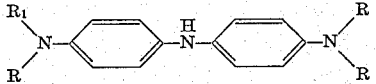

wherein each R is the same member of the group consisting of the one to four carbon alkyl radicals and $R_1$ is selected from the group consisting of R and hydroxyethyl.

2. Vulcanized rubber according to claim 1 in which the antiozonant is 4,4'-bis(dimethylamino)-diphenylamine.

3. Vulcanized rubber according to claim 1 in which the antiozonant is 4,4'-bis(diethylamino)-diphenylamine.

4. Vulcanized rubber having incorporated therein from about one to about five parts per 100 parts of rubber of, as an antiozonant, a compound of the formula:

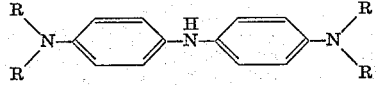

wherein R is a one to four carbon alkyl radical and all the R's are the same.

References Cited by the Examiner

UNITED STATES PATENTS

| 2,115,473 | 4/38 | Semon | 260—45.9 |
| 2,419,736 | 4/47 | Sloan | 260—45.9 |
| 2,494,059 | 1/50 | Ruggles | 260—45.9 |

FOREIGN PATENTS

| 812,467 | 4/59 | Great Britain. |

LEON J. BERCOVITZ, *Primary Examiner.*

ALPHONSO D. SULLIVAN, MILTON STERMAN, *Examiners.*

UNITED STATES PATENT OFFICE
CERTIFICATE OF CORRECTION

Patent No. 3,202,630                                         August 24, 1965

Frank A. V. Sullivan

It is hereby certified that error appears in the above numbered patent requiring correction and that the said Letters Patent should read as corrected below.

Column 5, line 5, for "minutes" read -- minute --; same column 5, TABLE 2, heading to the third column and column 6, TABLE 3, heading to the third column, for "4,4′-bis(dimethylamino)diphenylamine", each occurrence, read -- 4,4′-bis(diethylamino)diphenylamine --.

Signed and sealed this 22nd day of March 1966.

SEAL)
Attest:

ERNEST W. SWIDER                                        EDWARD J. BRENNER
Attesting Officer                                              Commissioner of Patents